United States Patent
Synal

(10) Patent No.: US 10,476,822 B2
(45) Date of Patent: Nov. 12, 2019

(54) MSRP/HTTP FILE TRANSFER

(71) Applicant: T-Mobile USA, Inc., Bellevue, WA (US)

(72) Inventor: Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 352 days.

(21) Appl. No.: 15/372,959

(22) Filed: Dec. 8, 2016

(65) Prior Publication Data
US 2018/0167345 A1 Jun. 14, 2018

(51) Int. Cl.
H04L 12/58 (2006.01)
H04L 29/08 (2006.01)
H04L 29/06 (2006.01)

(52) U.S. Cl.
CPC .......... H04L 51/066 (2013.01); H04L 51/10 (2013.01); H04L 65/1006 (2013.01); H04L 65/1073 (2013.01); H04L 67/02 (2013.01); H04L 67/2823 (2013.01); H04L 69/08 (2013.01)

(58) Field of Classification Search
CPC ....... H04L 51/066; H04L 51/10; H04L 67/02; H04L 67/2823; H04L 65/1006
See application file for complete search history.

(56) References Cited

U.S. PATENT DOCUMENTS 9,553,917 B2 * 1/2017 Choi ................. H04L 67/06
9,692,800 B2 * 6/2017 Gaunt ............... H04L 65/4084
2007/0255792 A1 * 11/2007 Gronberg ........... H04L 51/066
  709/206
2008/0043717 A1 * 2/2008 Bellora ............. H04M 7/0027
  370/352
2013/0198382 A1 * 8/2013 Wang ............... H04L 65/1069
  709/225
2014/0258430 A1 * 9/2014 Choi ................. H04L 67/06
  709/206
2014/0258476 A1 * 9/2014 Choi ................. H04L 67/06
  709/219
2014/0379931 A1 * 12/2014 Gaviria ............. H04L 65/1016
  709/227

(Continued)

OTHER PUBLICATIONS

PCT Search Report and Written Opinion dated Feb. 19, 2018 for PCT Application No. PCT/US17/61827, 15 pages.

*Primary Examiner* — Michael C Lai
(74) *Attorney, Agent, or Firm* — Lee & Hayes, P.C.

(57) ABSTRACT

Systems and methods for transferring files between message session relay protocol (MSRP) and hypertext transfer protocol (HTTP) enabled devices. The system can use a rich communication services (RCS) server to receive messages, look up receiving device configurations, and convert, as necessary, messages between MSRP and HTTP. The system can include a file server to store and compile files during the transfer process. The RCS server can receive an HTTP message from an HTTP enabled sending device, divide the HTTP message into a plurality of discreet MSRP data packets, and send an MSRP request to an MSRP enabled receiving device. The RCS server can also receive an MSRP request, including a plurality of discreet MSRP data packets from an MSRP enabled sending device, combine the MSRP data packets into a single HTTP file, and send an HTTP message to an HTTP enabled receiving device.

20 Claims, 7 Drawing Sheets

(56) References Cited

U.S. PATENT DOCUMENTS

2015/0189090 A1* 7/2015 Regan ............... H04M 3/53333
 455/413
2016/0021146 A1* 1/2016 Mufti .................. H04L 65/1016
 370/328

* cited by examiner

MSRP/HTTP FILE TRANSFER

BACKGROUND

The use of mobile devices such as cellular telephones and other devices with cellular data connectivity is proliferating. Almost everyone has some sort of mobile, data-enabled device, and many people have multiple devices. Users can access different networks using a single mobile device, and can access voice, text, and multimedia data from various network-accessible and Internet-accessible entities. Furthermore, mobile device complexity is increasing, with more and more advanced and power-efficient processors, display interfaces, and applications that provide greatly improved user experiences.

Various types of communications may be supported by network-provided services referred to as rich communication services (RCS). In some cases, different networks may use different message protocols to provide RCS and other services. North American providers tend to use message session relay protocol (MSRP) file transfer, for example, while European providers tend to use hypertext transfer protocol (HTTP).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
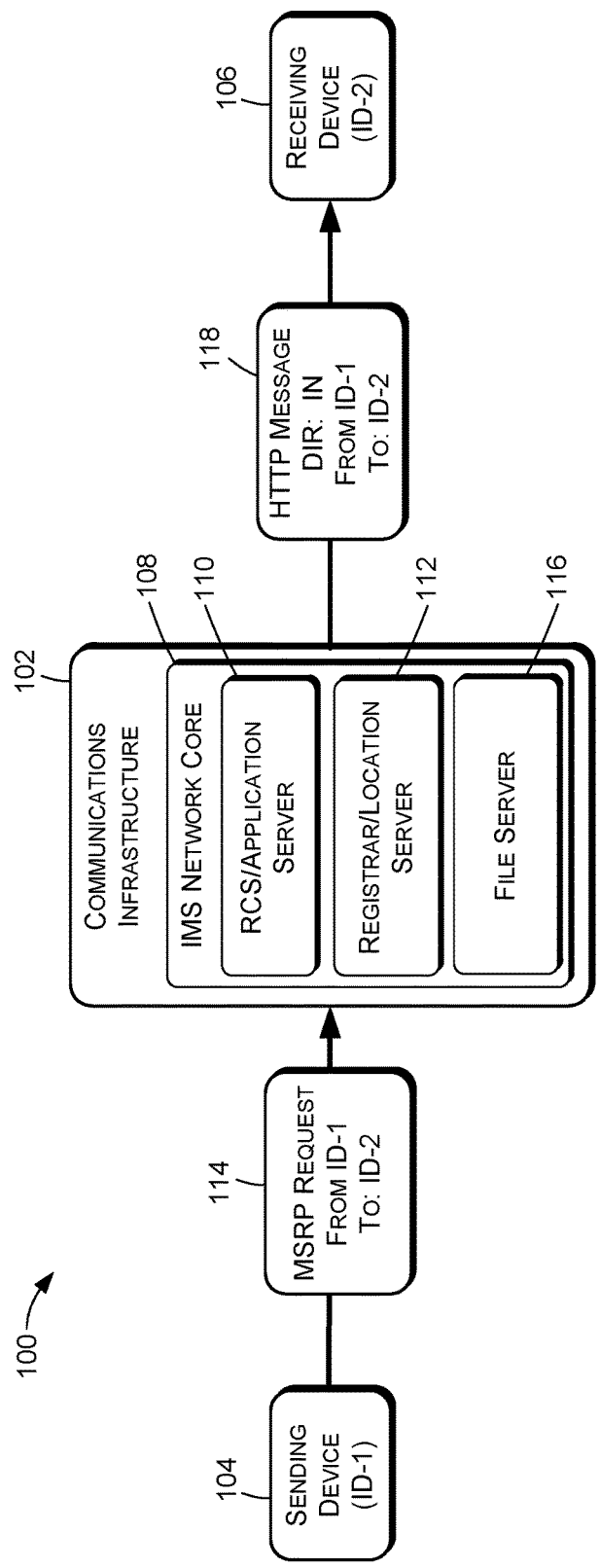
FIG. 1 is a schematic diagram depicting a message session relay protocol (MSRP) enabled sending device sending an MSRP request to a rich communication services (RCS) server, the message being converted to an HTTP message by the RCS server, and the HTTP message being sent to an HTTP enabled receiving device, in accordance with some examples of the present disclosure.

The described implementations provide devices, systems, and methods for translating rich communication services (RCS) messages between networks using message session relay protocol (MSRP) file transfer and networks using hypertext transfer protocol (HTTP) file transfer. Examples of devices include smartphones, tablet computers, wearable devices, and personal computers, among other things.

Each device may have an RCS communications client that presents a history of communications between parties. Often, such a communications client will differentiate between outgoing messages and incoming messages, where outgoing messages are the messages sent by the user of the device and incoming messages are the messages received from other users. Outgoing messages may be displayed on one side of a display window, for example, and incoming messages may be displayed on the other side of the display window.

When communicating with other devices, a sending device associated with a first user may send a HTTP message addressed to a second user. The HTTP message may have a FROM field indicating the user ID of the first user and a TO field indicating the user ID of the second user. The HTTP message is sent by the sending device to an RCS server, which forwards the message to any devices that are associated with the URI of the second user.

Conventionally, messages sent using HTTP cannot be received by devices configured for MSRP, and vice-versa. In addition, because all devices on the same network tend to use the same communications protocols, the RCS server does not, and does not need to, track which devices use HTTP and which devices used MSRP. Thus, on a conventional network, while the RCS server may send the message from an MSRP configured device to an HTTP configured device, the message would not be received. Thus, while the RCS server knows what technology the receiving client supports (e.g., MSRP or HTTP), in the case of mismatches, no mechanism exists to convert from one file type to the other.

As the telecommunications world, and indeed the world in general, becomes more global, new standards may arise that require that networks be able to provide communication between these two file types (and other files types). Thus, a message sent using MSRP can be received on an HTTP enabled device, and vice-versa. This can enable European and North American phones roaming on foreign networks, for example, to receive messages despite dissimilar technologies.

To this end, an RCS server configured to keep track of which devices support MSRP, which devices support HTTP, and which devices support other file types would be useful. When registering for RCS, for example, a device that supports MSRP can includes an "MSRP" flag, or other token, as part of the request-disposition header in a session initiation protocol (SIP) REGISTER message to an RCS server. Similarly, when registering for RCS, a device that supports HTTP can includes an "HTTP" flag, or other token, as part of the request-disposition header in a SIP REGISTER message to the RCS server. The RCS server can then record this information, perhaps in a separate file type database, for each device.

In addition, as discussed below, when the RCS server receives an MSRP message bound for an HTTP device, for example, the RCS server can receive the data packets of the MSRP message, compile them into a single HTTP file, and then provide them to the HTTP device in the form of an HTTP download link, or similar. When receiving an HTTP message bound for an MSRP device, on the other hand, the RCS server can download the HTTP file, break the file into an appropriate number of MSRP data packets, and send the data packets to the MSRP device as an MSRP request.

FIG. 1 illustrates a mobile communication system 100 in which some of the described techniques may be implemented. The system 100 comprises a communications infrastructure 102 that provides communications between a sending device 104 and one or more receiving devices 106. Each of the sending 104 and receiving devices 106 may comprise a device having network communication capabilities such as a smartphone, a telephone handset, a headset, a wearable device, a computer, a personal computer, a desktop computer, a laptop computer, a tablet computer, etc. The communication capabilities of the devices 104, 106 may include Wi-Fi capabilities, cellular or other telephony capabilities, and/or other wired or wireless network communication capabilities.

FIG. 1 shows an MSRP enabled sending device 104 and an HTTP enabled receiving device 106. The receiving user has a user ID that is associated with the HTTP enabled receiving device 106, which for purposes of discussion is shown as ID-2, and which may also comprise an HTTP URL. And, while shown as a single sending device 104 and a single receiving device 106, through the use of forking and other technologies, the messages can be sent from, and received by, multiple devices associated with the relevant user ID.

Although only one sending device 104 associated with a single user (ID-1) is shown in FIG. 1, many different sending devices 104, associated with many different users, may access the communication infrastructure 102 in order to initiate communications with one or more devices of receiving users. Similarly, although only a single receiving device 106 is shown in FIG. 1, large numbers of devices, associated with many users, may be used in the system 100. Furthermore, any given device may act as either a sending device or a receiving device in a given communication.

The communications infrastructure 102 may comprise a telephonic, cellular communications network, as an example. In some cases, for example, the communications infrastructure 102 may comprise a wireless, cellular communications network implemented in accordance with the System Architecture Evolution (SAE) communication standard and provided by a cellular communication services provider. In certain implementations, the system 100 may be implemented at least in part as a long-term evolution (LTE) cellular network. More generally, the system 100 may be implemented using any of various wireless networking technologies, including global system for mobile (GSM), general packet radio service (GPRS), enhanced data rates for GSM evolution (EDGE), universal mobile telecommunications system (UMTS), code-division multiple access (CDMA), various types of packet-switched networks, IEEE 702.11 networks (generally referred to as Wi-Fi), and so forth.

In LTE and other cellular environments, the communications infrastructure 102 may comprise a number of geographically dispersed base stations, or cell towers (not shown), comprising radio transceivers and antennas for communicating with corresponding transceivers of the devices 104 and 106. In many cases, the cellular infrastructure may provide connectivity with the Internet and various services and servers that are accessible through the Internet.

The communications infrastructure 102 may include an Internet protocol multimedia system (IMS) IMS network core 108, which may be referred to at times simply as an IMS network. The IMS network core 108 provides RCS services, which may be implemented as one or more RCS servers and/or application servers 110. The IMS network core 108 may also implement a registrar server and/or location server 112, with which individual devices can register using HTTP, and other, protocols to indicate their availability and other information to the IMS network core 108. As will be described in more detail below, some devices may use the process of registration to indicate whether they support HTTP or MSRP file transfer protocols.

Note that different ones of the devices 104 and 106 may use different wireless networking technologies for accessing the telephonic communications network. For example, one device may use Wi-Fi connectivity while another device may use a cellular connection. Yet another device may connect to the communications network through a wired Ethernet connection. The communications infrastructure 102 may include services in addition to those shown in order to support communications between sending devices and receiving devices. Types of provided supported communications may include voice communications, video communications, textual communications, and so forth.

In certain situations, the sending device 104 may send an MSRP request 114 to a user associated with the user ID "ID-2," who is in turn associated with the receiving device 106. The MSRP request 114 may comprise, for example, FROM and TO fields. The FROM field indicates the user ID of the user that is sending the message, which in this case is ID-1. The TO field indicates the user ID of the user to whom the message is addressed, which in this case is ID-2.

Normally, the RCS server 110 receives the MSRP request 114 from the sending device 104 and forwards it to the one or more receiving devices 106 that are associated with the user ID specified by the "TO" field. Thus, in the illustrated example, the MSRP request 114 is forwarded to the receiving device 106 based on the TO field value ID-2. In addition, if applicable, the RCS server 110 forwards the MSRP request 114 to any additional devices that are associated with the user ID specified by the "FROM" field.

In this case, however, because the communications infrastructure 102 provides communications services for both MSRP and HTTP devices, the RCS server 110 first determines whether the incoming MSRP request 114 is in the correct format for the receiving device 106. In other words, the incoming MSRP request 114 is obviously in MSRP format, but the receiving device 106 is configured to receive HTTP files. As a result, then the RCS server 110 can perform additional steps to provide compatibility between the two file transfer protocols.

To this end, in some examples, the RCS server 110 can also comprise a file server 116. The file server 116 can be internal, external, or remote to the RCS server 110 and can include one or more memory storage devices to act as a buffer. In other words, when the RCS server 110 receives an MSRP request bound for an HTTP enabled receiving device 106, for example, the RCS server 110 can receive the individual data packets of the MSRP request 114, compile and save the data packets on the file server 116, and, when all data packets have been received and assembled, send an HTTP message 118, which includes a link, or other address identifier, associated with the assembled HTTP file to the receiving device 106.

When forwarding, the RCS server 110 may add a header to the request, indicating for each recipient of the request whether the content is incoming or outgoing with respect to the recipient. More specifically, the RCS server 110 creates an HTTP message 118 to the receiving device 106, wherein the HTTP message 118 specifies the same content as the MSRP request 114, but in HTTP format. The HTTP message 118 can contain a header, which may be a header within a common presence and instant messaging (CIPM) data object of the request 118, indicating that the HTTP message 118 specifies incoming content with respect to the receiving device 106. In this example, the header comprises a name/value pair "DIR: IN".

Figure 2:
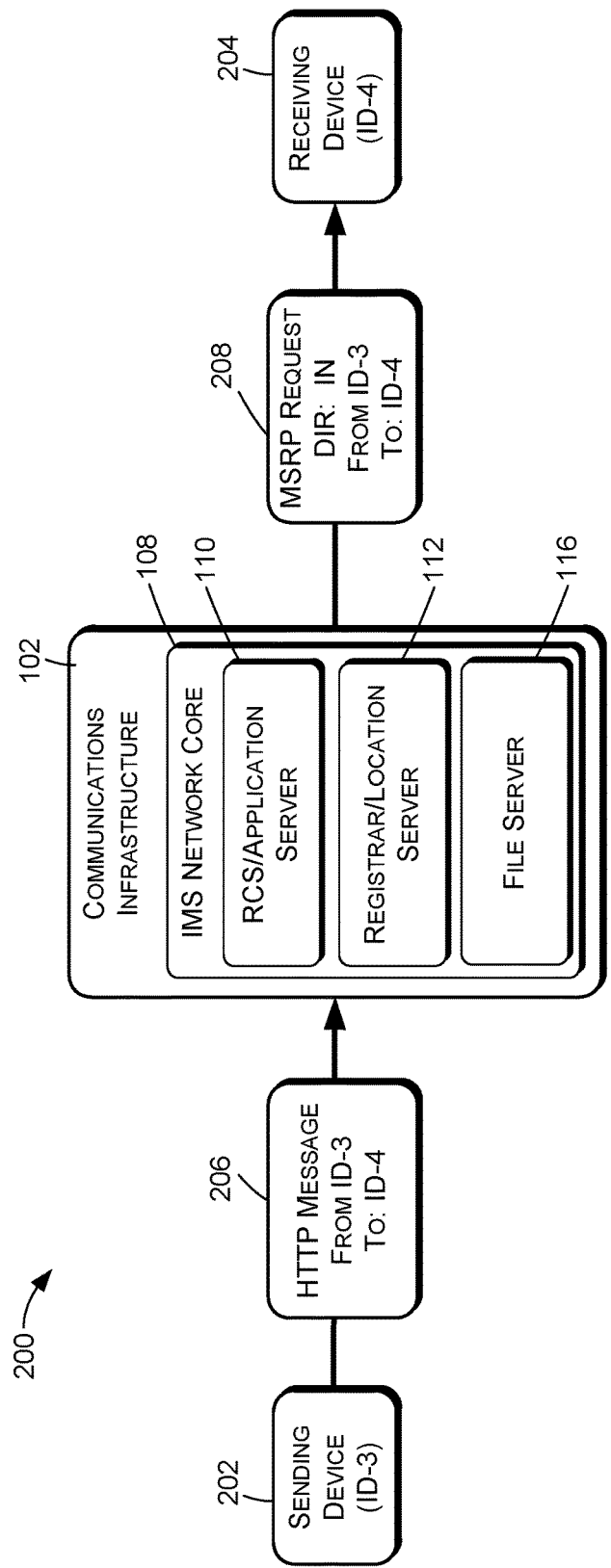
FIG. 2 is a schematic diagram depicting an HTTP enabled sending device sending an HTTP message to the RCS server, the message being converted to an MSRP request by the RCS server, and the MSRP request being sent to an MSRP enabled receiving device, in accordance with some examples of the present disclosure.

FIG. 2 illustrates the same mobile communication system 100 as FIG. 1, except that in this case content is being sent from an HTTP enabled sending device 202 to an MSRP enabled receiving device 204. MSRP can be used within RCS for certain types of real-time session based communications, such as one to one and group chat. The HTTP enabled sending device 202 sends an HTTP message 206 to the MSRP enabled receiving device 204 through the IMS network core 108. The HTTP message 206 specifies message content, which may be an HTTP link, for example, and the ID of the sending device 202, which in this case is ID-3, and the ID of the receiving device 204, which in this case is ID-4.

The RCS server 110 receives the HTTP message 206, modifies it, and forwards it to the receiving device 204. More specifically, the RCS server 110 can download the contents of the HTTP message (e.g., an HTTP file from an HTTP download link), saves the HTTP file internally (or to the file server 116), and then divides the HTTP file into multiple MSRP data packets. The RCS server 110 then creates and sends an MSRP request 208 to the receiving device 106, wherein the MSRP request 208 contains the same content as the HTTP message 206, but in MSRP format. The MSRP request 208 can include a header, which may comprise a header within a CIPM data object of the MSRP request 208, indicating that the MSRP request 208 specifies incoming content with respect to the receiving device 106. In this example, the header comprises a name/value pair "DIR: IN".

Figure 3:
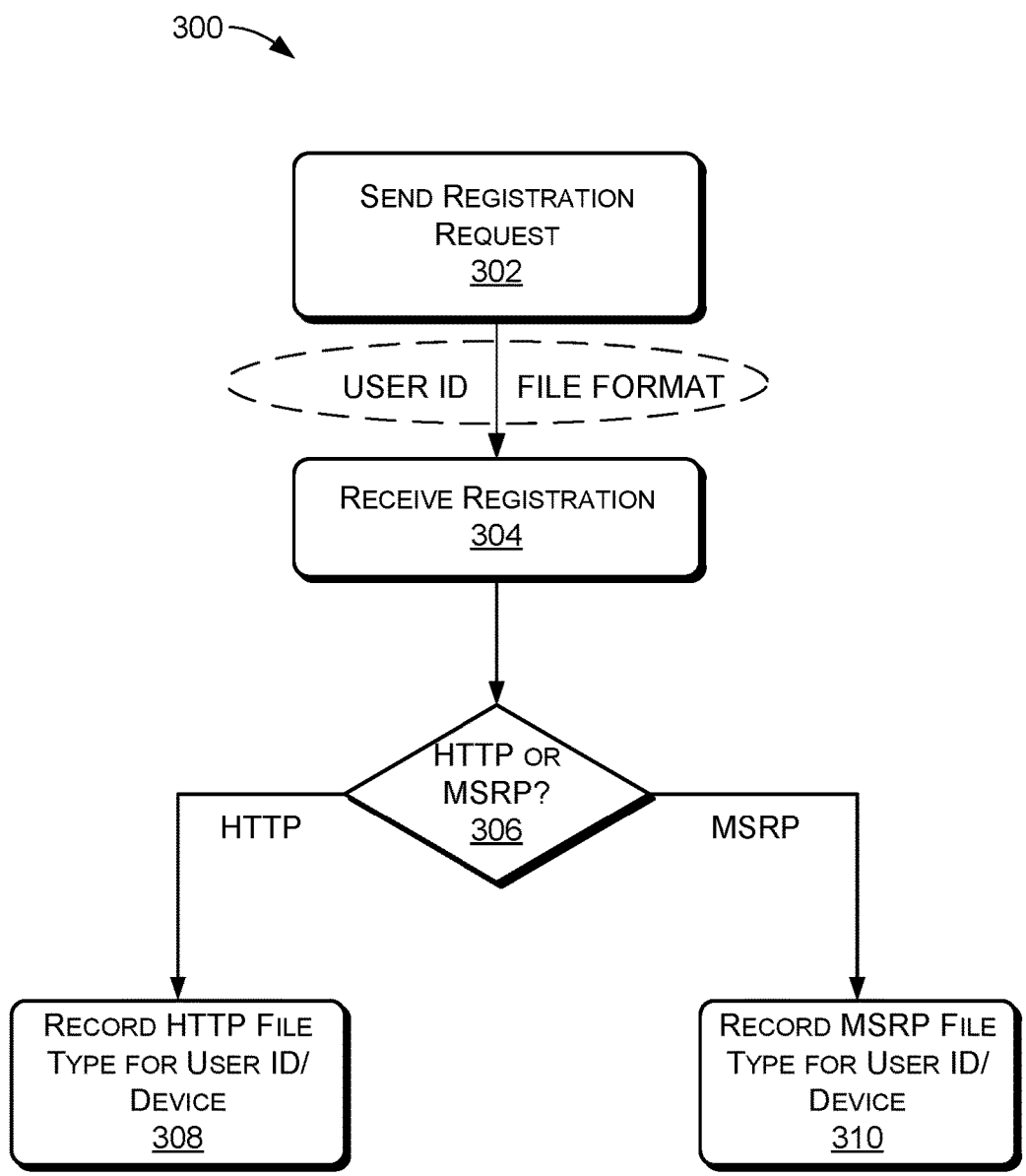
FIG. 3 is a flowchart depicting a process of registering, with the RCS server, as an MSRP enabled device or an HTTP enabled device, in accordance with some examples of the present disclosure.

FIG. 3 shows an example registration method 300 that may be performed in order to indicate and record the file type support for each subscribing device. The actions include actions by a sending device 104, 202, a receiving device 106, 204, and actions by a component of the IMS network core 108, such as by the registrar/location server 112 or the RCS server 110 of the IMS network core 108.

At 302, the sending device 104, 202, for example, can register the availability of the sending device 104, 202 with the IMS network core 108, such as by sending a SIP REGISTRATION request to the registrar/location server 112. The SIP REGISTRATION request may be sent periodically, such as when the sending device 104, 202 first becomes available to the IMS network core 108 and/or at other times depending on implementation.

Among other things, the SIP REGISTRATION request can include the user ID (e.g., ID-1 or Id-3, respectively) associated with the sending device 104, 202. The SIP REGISTRATION request may also include a data token, or other entry, indicating that the sending device 104, 202 is capable of sending and receiving either HTTP or MSRP messages. That is, the presence of the data token indicates that the registering sending device 104, 202 is configured to properly handle either HTTP or MSRP messages. In one implementation, the data token may be specified as a request-disposition field in a request header of a SIP REGISTRATION request.

At 304, the registrar/location server 112 or the RCS server 110 of the IMS network core 108 receives the registration request from the sending device 104, 202. At 306, the registrar/location server 112 or RCS server 110 determines whether the data token indicates the use of HTTP transfer protocols or MSRP transfer protocols. In some cases, the SIP REGISTRATION may not contain a data token indicating that the sending device 104, 202 uses the default file format for the IMS network core 108. In other words, if the service provider associated with the IMS network core 108 is in North America, then the IMS network core 108 most likely uses MSRP by default. If the service provider associated with the IMS network core 108 is in Europe, on the other hand, then the IMS network core 108 most likely uses MSRP by default. Of course, the default file transfer protocol can be set as desired by each service provider, network, or other entity.

At 308, if the data token indicates HTTP, the registrar/location server 112 or RCS server 110 records the sending device 104, 202 from which the SIP REGISTRATION request was received as an HTTP device (e.g., sending device 202). If the data token indicates MSRP, on the other hand, the registrar/location server 112 or RCS server 110 records the sending device 104, 202 from which the SIP REGISTRATION request was received as an MSRP device (e.g., sending device 104). Thus, the RCS server 110 can compile a file type database including a list of MSRP devices and a list of HTTP devices for future reference.

Note that the data token may be provided in different ways, such as a name-value pair, a tag, a flag, a value, etc. Furthermore, the sending device 104, 202 may indicate its support of one file type or the other within communications other than SIP REGISTRATION messages. For example, various types of SIP messages or methods sent from a sending device 104, 202 may include a request header and a request-disposition field, and the request disposition field can be used to indicate which type of file transfer the sending device 104, 202 supports in these various types of SIP messages.

Note also that upon receiving a SIP REGISTRATION request, the registrar/location server 112 and/or the RCS server 110 can also record other capabilities of the sending device 104, 202 and may perform other actions in order to process the SIP REGISTRATION request. The RCS server 110 can then use this classification (e.g., MSRP or HTTP) when passing message between various devices. As discussed below, when passing messages between devices with matching messaging protocols (e.g., HTTP to HTTP), then RCS server 110 can merely pass the message along. When passing messages between devices with disparate messaging protocols (e.g., HTTP to MSRP), on the other hand, the RCS server 110 may perform additional steps to facilitate communication. And, while discussed above in terms of the sending devices 104, 202, the same registration method 300 also applies to receiving devices 106, 204.

Figure 4:
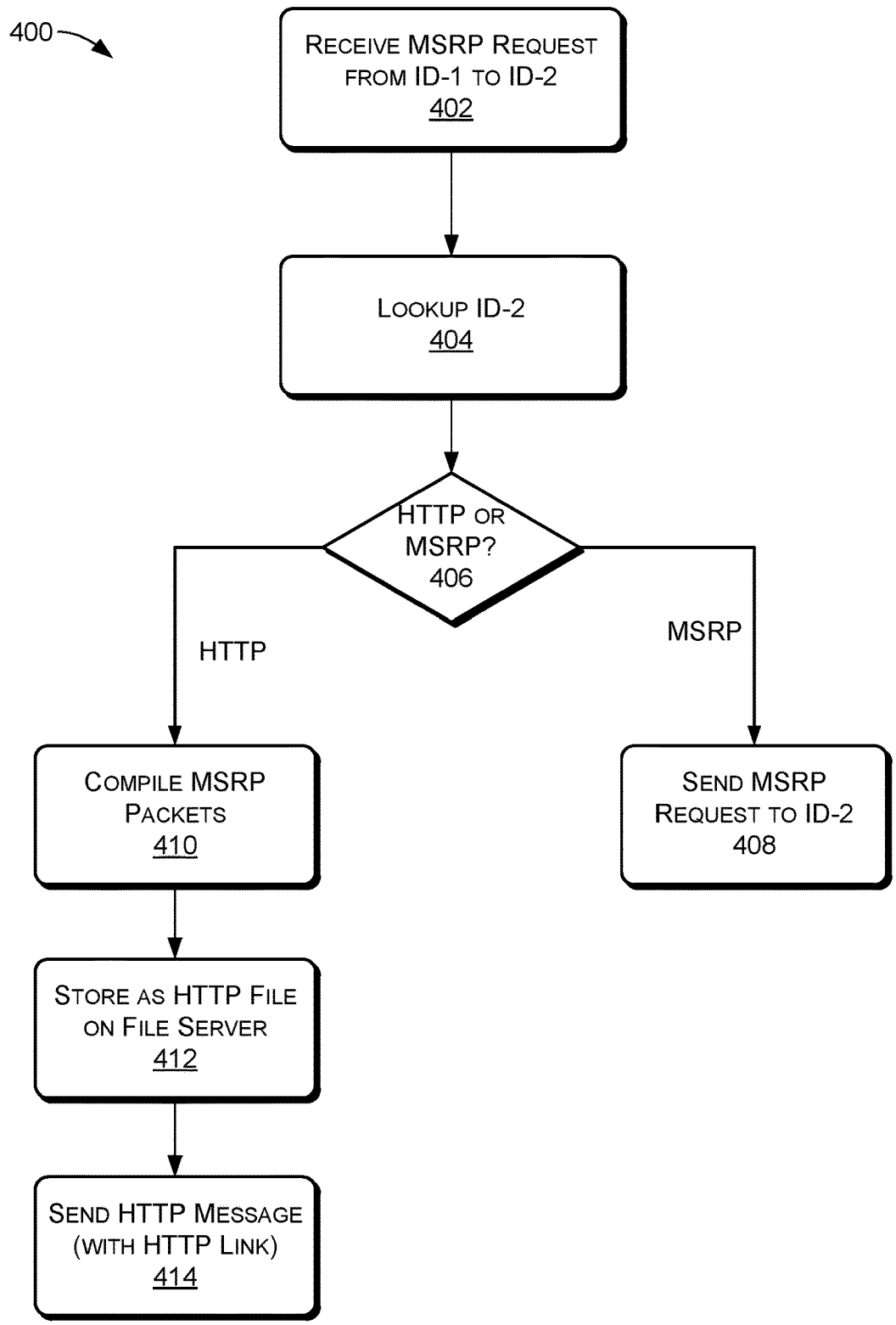
FIG. 4 is a flowchart depicting a process of sending an MSRP request from an MSRP enabled sending device to an HTTP enabled receiving device, in accordance with some examples of the present disclosure.

FIG. 4 shows an example method 400 that may be used in the environment described with reference to FIG. 1 to send a message from an MSRP enabled device (e.g., sending device 104) to an HTTP enabled device (e.g., receiving device 106). For ease of explanation, therefore, the method 400 is discussed below with reference to these two devices 104, 106. One of skill in the art will recognize, however, that these devices 104, 106 are merely examples and that the method 400 is equally applicable to any two devices where the sending device uses MSRP and the receiving device uses HTTP.

At 402, the RCS server 110 can receive an MSRP request from the sending device 104 (ID-1) bound for the receiving device 106 (ID-2). Based on the format of the incoming message, the RCS server 110 knows that the message is in MSRP format and begins receiving the individual data packets that make up the entire MSRP message. In some examples, as discussed below, the RCS server 110 may compile and store these messages internally. In other examples, the RCS server 110 may store these message on the aforementioned file server 116, or another server, in communications with the RCS server 110. In some examples, the file server 116 can be remote to the RCS server 110.

At 404, the RCS server 110 can look up the file type compatibility for the receiving device 106. In some examples, as mentioned above, the RCS server 110 can refer to a file type database including the file type compatibility for all currently registered devices. This information can be provided during the registration method 300 described above with reference to FIG. 3. In other examples, the RCS server 110 can send a query to the registrar/location server 112 to obtain the file type compatibility for the receiving device 106.

At 406, the RCS server 110 can determine whether the receiving device 106 (ID-2) is compatible with MSRP or HTTP files. At 408, if the receiving device 106 is an MSRP compatible device, the RCS server 110 can simply pass the message on to the receiving device 106. Since the receiving device 106 is compatible with MSRP messages, no additional processing is required. The RCS server 110 can simply send a properly formatted MSRP message to the receiving device 106 in the conventional manner.

At 410, if the receiving device 106 is an HTTP device, on the other hand, the message can be converted from MSRP to HTTP. In this case, because MSRP messages tend to be sent in multiple discreet data packets and HTTP messages tend to comprise entire files (or links to entire files), the RCS server 110 (or the file server 116) can first compile the multiple MSRP data packets into a single HTTP file. In some examples, the HTTP file may also be associated with an internet protocol (IP) address, or other address, to enable the receiving device 106 to download the compiled HTTP file.

At 412, in some examples, the compiled HTTP file can be stored on a dedicated file server 116. The file server 116 can be connected to the RCS server 110 and/or the IMS network core 108 and can store the HTTP files and fulfill requests form the receiving device 106 to download the HTTP file. The file server 116 can be internal to, collocated with, or remote to the RCS server 110 an can be in communication with the RCS server via the communications infrastructure 102.

At 414, the RCS server 110 or the file server 116 can send the HTTP version of the message to the receiving device 106. In some examples, the RCS server 110 or the file server 116 can send an HTTP link to the receiving device 106 to enable the receiving device to download the HTTP file from the RCS server 110 or the file server 116. In other examples, the RCS server 110 or the file server 116 can send a SIP message including an HTTP link, IP address, or other address information identifying the location of the compiled HTTP file. Thus, the method 400 has enables an MSRP enabled sending device 104 to send a message or file to an HTTP enabled receiving device 106.

Figure 5:
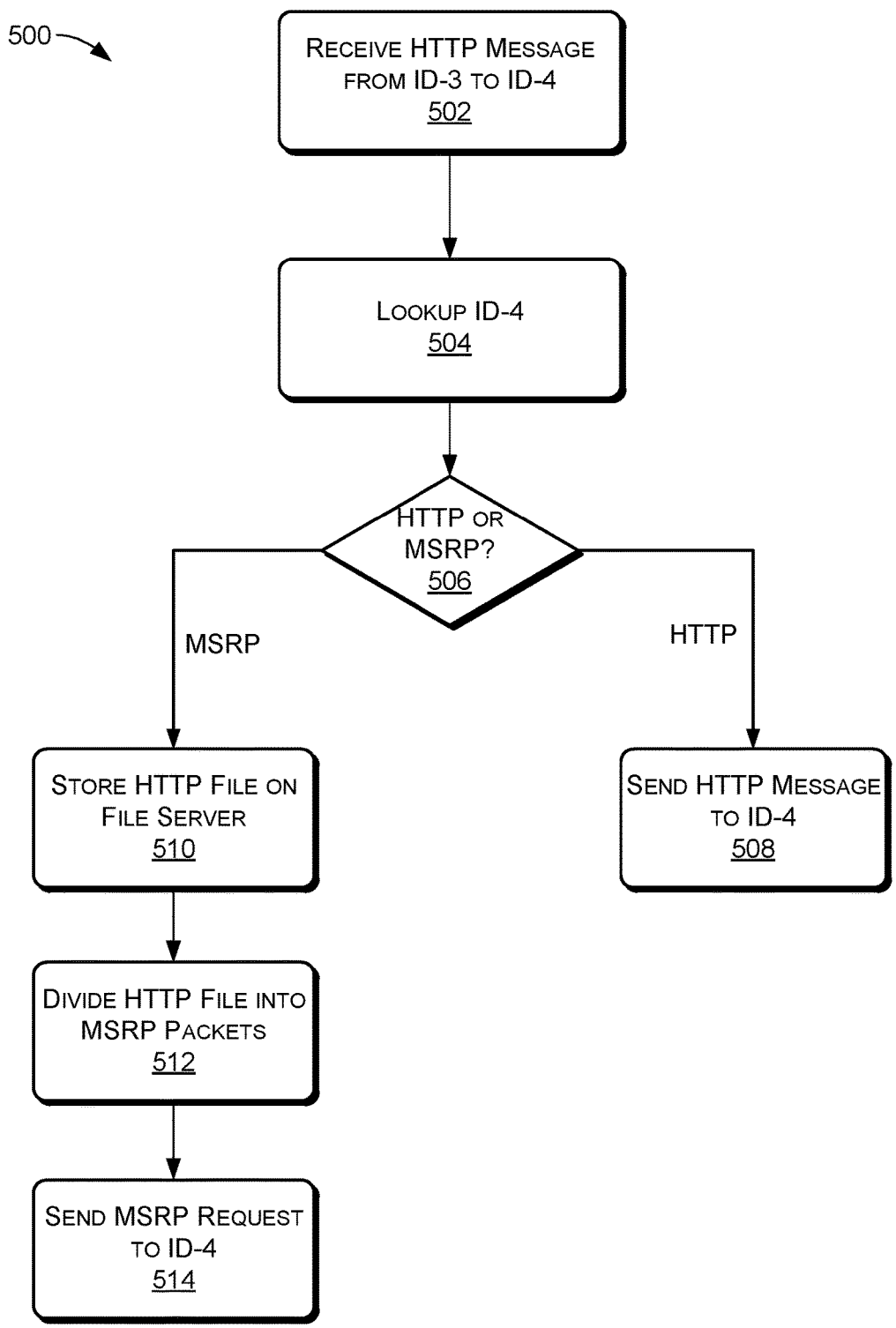
FIG. 5 is a flowchart depicting a process of sending an HTTP message from an HTTP enabled sending device to an MSRP enabled receiving device, in accordance with some examples of the present disclosure.

FIG. 5 shows an example method 500 that may be used in the environment described with reference to FIG. 2 to send a message from an HTTP enabled device (e.g., sending device 202) to an MSRP enabled device (e.g., receiving device 204). For ease of explanation, therefore, the method 500 is discussed below with reference to these two devices 202, 204. One of skill in the art will recognize, however, that these devices 202, 204 are merely examples and that the method 500 could be used to send messages and filed between any two devices where the sending device uses HTTP and the receiving device uses MSRP.

At 502, the RCS server 110 can receive an HTTP file from the sending device 202 (ID-3) bound for the receiving device 204 (ID-4). Based on the format of the incoming message, the RCS server 110 knows that the message is in HTTP format and begins to download the HTTP file associated with the message. In some examples, as discussed below, the RCS server 110 may store the HTTP file internally. In other examples, the RCS server 110 may store the HTTP file on the aforementioned file server 116, or on another server.

At 504, the RCS server 110 can look up the file type compatibility for the receiving device 204. In some examples, as mentioned above, the RCS server 110 can refer to a file type database, which can include the file type compatibility for all currently registered devices. This information can be provided during the registration method 300 described above with reference to FIG. 3. In some examples, the RCS server 110 can obtain this information from the registrar/location server 112 or another component of the IMS network core 108.

At 506, the RCS server 110 can determine whether the receiving device 204 (ID-4) is compatible with MSRP or HTTP files. At 508, if the receiving device 204 is an HTTP compatible device, the RCS server 110 can simply pass the message on to the receiving device 204. In other words, since the receiving device 204 is compatible with HTTP messages, no additional processing is required. The RCS server 110 can simply send a properly formatted HTTP message containing a relevant download link, for example, to the receiving device 204 in the conventional manner.

At 510, if the receiving device 204 is an MSRP device, on the other hand, the message can be converted from HTTP to MSRP. In this case, because MSRP messages tend to be sent in multiple discreet data packets and HTTP messages tend to comprise entire files, the RCS server 110 (or the file server 116) can first split the HTTP file into multiple MSRP data packets.

At 512, in some examples, the MSRP data packets can be stored on the dedicated file server 116. The file server 116 can be connected to the RCS server 110 and/or the IMS network core 108 and can store the MSRP data packets until the HTTP file has been fully processed, the RCS server 110 is ready to send the MSRP request, and the content has been downloaded by the receiving device 204. At 514, the RCS server 110 or the file server 116 can begin sending the MSRP data packets to the receiving device 204.

In either methods 400, 500, the time required to upload, convert, and download the files is generally relatively short. Thus, the RCS server 110 or the file server 116 can store the MSRP data packets as they are received from the sending device 104, for example, compile them into an HTTP file, and the receiving device 106 can download the HTTP file from the RCS server 110 or the file server 116 (or vice-versa) in a matter of seconds or minutes. The MSRP data packets and/or HTTP files can then be deleted. As a result, the RCS server 110 or file server 116 can include only enough memory to handle the "bandwidth" of the messages being sent, though more memory may be nonetheless available.

Figure 6:
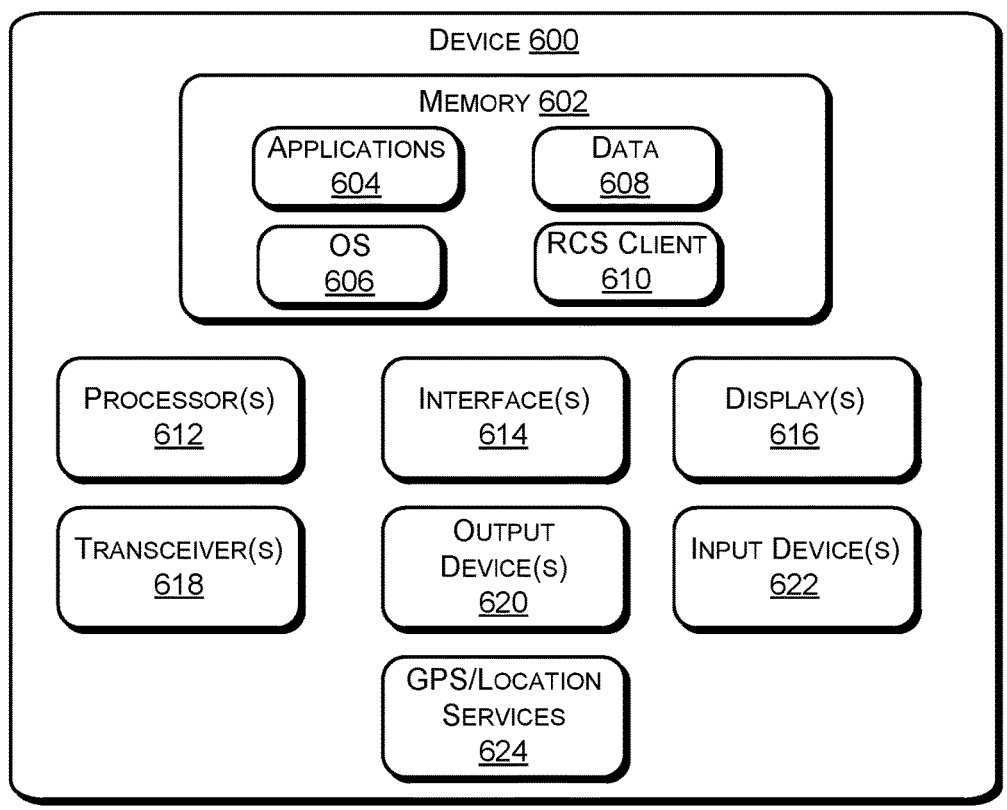
FIG. 6 is a component level schematic for an electronic device for use with the system, in accordance with some examples of the present disclosure.

FIG. 6 illustrates an example device 600 in accordance with various examples. The device 600 is illustrative of example components of the sending devices 104, 202 and receiving devices 106, 204. The device 600 can include a memory 602, which may store applications 604, an operating system (OS) 606, data 608, and an RCS client 610, among other things. The device 600 can also include one or more: processors 612, interfaces 614, displays 616, transceivers 618, output devices 620, input devices 622, and GPS/location services 624.

In various examples, the memory 602 includes both volatile memory and nonvolatile memory. The memory 602 can also be described as non-transitory computer storage media and may include removable and non-removable media implemented in any method or technology for storage of information, such as computer-executable instructions, data structures, program modules, or other data. The applications 604, OS 606, data 608, and RCS client 610 can be stored in the memory 602. In some examples, the memory 602 can include the RCS client 610, which may comprise an application or other software components for performing RCS communications in the manner described above. Additionally, in some examples, the memory 602 may include a SIM (subscriber identity module), which is a removable smart card used to identify a user of the device 600 to a service provider network.

Non-transitory computer-readable media may include, but are not limited to, random access memory (RAM), read only memory (ROM), electrically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the device 600. Any such non-transitory computer-readable media may be part of the device 600.

In some examples, the processor(s) 612 can comprise a central processing unit (CPU), a graphics processing unit (GPU), both CPU and GPU, or other processing unit(s) or component(s) known in the art. In various examples, the interface(s) 614 can be any sort of interfaces known in the art. The interface(s) 614 may include any one or more wireless local-area network (WLAN) interfaces, near field interfaces, digital enhanced cordless telecommunications (DECT) chipsets, or interfaces for an RJ-11 or RJ-45 port or other Ethernet interfaces. A wireless LAN interface can include, for example, a Wi-Fi, Wi-Max, or Bluetooth® interface that performs the function of transmitting and receiving wireless communications using, for example, the IEEE 602.11, 602.16, and/or 602.20 standards. The near field interface can include a Bluetooth® interface or radio frequency identifier (RFID) interface, among other things, for transmitting and receiving near field radio communications via a near field antenna. The near field interface may be used for functions such as, for example, communicating directly with nearby devices that are also, for instance, Bluetooth® or RFID enabled.

In various examples, the display(s) 616 may comprise a liquid crystal display (LCD), thin-film transistor (TFT) display, light emitting diode (LED) display, or any other type of display commonly used in telecommunication devices or other portable devices. The display(s) 616 may also be a touch-sensitive display screen, which may also act as an input device 622—e.g., a touch keypad, touch keyboard, soft touch navigation buttons, etc.

In some examples, the transceiver(s) 618 can include any sort of transceivers known in the art. The transceiver(s) 618 can comprise, for example, radios and/or radio transceivers and interfaces that perform the function of transmitting and receiving radio frequency communications via an antenna, through a cellular communication network of a wireless data provider, for example, or via a Wi-Fi router. The transceiver(s) 618 facilitate wireless connectivity between the device 600 and various cell towers, base stations, routers, and/or access points.

In some examples, the output device(s) 620 can include any sort of output devices known in the art, such as a display (already described as display 616), speakers, a vibrating mechanism, lights, or a tactile feedback mechanism. The output device(s) 620 also include ports for one or more peripheral devices, such as headphones, peripheral speakers, or a peripheral display.

In various examples, the input device(s) 622 can include any sort of input devices known in the art. The input device(s) 622 may include, for example, a microphone, a keyboard/keypad, or a touch-sensitive display (such as the touch-sensitive display 616 described above). A keyboard/keypad may be a push button numeric dialing pad (such as on a typical telecommunication device), a multi-key keyboard (such as a conventional or touchscreen QWERTY keyboard), or one or more other types of keys or buttons, and may also include a joystick-like controller, designated navigation buttons, or the like. The device 600 may also have a GPS (global positioning system), cellular location system, or other navigation receiver(s) 624 for determining the current location of the device 600 based on signals received from satellites, cell towers, Wi-Fi routers, or other location sources.

Figure 7:
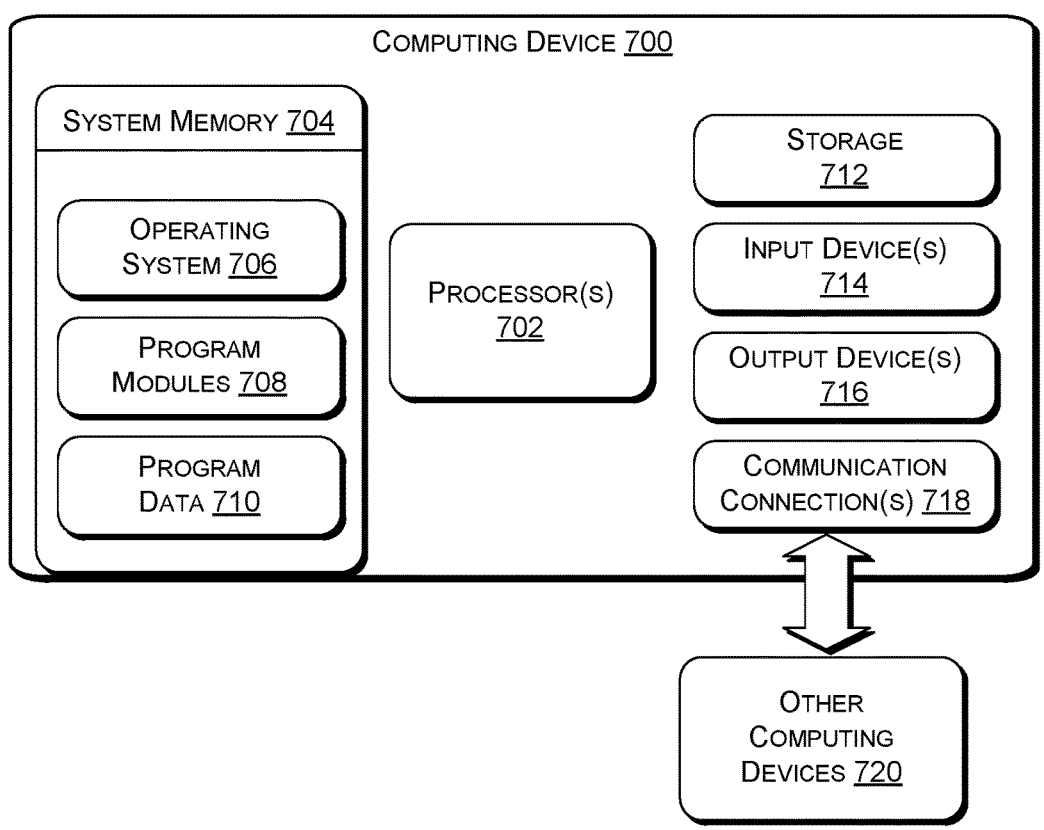
FIG. 7 is a component level schematic for a computing device for use with the system, in accordance with some examples of the present disclosure.

FIG. 7 is a block diagram of an illustrative computing device 700 such as may be used to implement various components of the communication infrastructure 102 including servers, routers, gateways, administrative components, etc. One or more computing devices 700 may be used, for example, to implement the RCS server 110, the registrar/location server 112, and the file server 116, among other things.

In various examples, the computing device 700 may include one or more processors 702 and system memory 704. Depending on the exact configuration and type of computing device, the system memory 704 may be volatile (such as RAM), nonvolatile (such as ROM, flash memory, etc.), or some combination thereof. The system memory 704 may include an operating system 706, one or more program modules 708, and may also include program data 710.

The computing device 700 may also include additional data storage devices (removable and/or non-removable) such as, for example, magnetic disks, optical disks, or tape. Such additional storage is illustrated in FIG. 7 by storage 712. Non-transitory computer storage media of the computing device 700 may include volatile and nonvolatile, removable and non-removable media implemented in any method or technology for storage of information, such as computer-executable instructions, data structures, program modules, or other data. The system memory 704 and storage 712 are all examples of computer-readable storage media. As before, non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such non-transitory computer-readable storage media may be part of the computing device 700.

In various examples, a portion of the system memory 704 and storage 712 may store programming instructions or program modules 708 which, when executed, implement some or all of the function functionality described above as being implemented as methods 400, 500 and by the communications infrastructure 102, the RCS server 110, the registrar/location server 112, the file server 116, and/or any other services implemented by the communication infrastructure 102.

The computing device 700 may also have one or more input devices 714 such as a keyboard, a mouse, a touch-sensitive display, voice input device, etc. Output device(s) 716 such as a display, speakers, a printer, etc. may also be included. The computing device 700 may also contain one or more communication connections 718 to enable the device to communicate with other computing devices 720, such as the devices 104, 106, 202, 204 discussed above.

While several possible examples are disclosed above, examples of the present disclosure are not so limited. For instance, while systems and methods for use with various electronic equipment has been disclosed, the system could be used on electronic equipment not mentioned, or other types of equipment without departing from the spirit of the disclosure. In addition, the location and configuration used for various features of examples of the present disclosure such as, for example, the devices 104, 106, 202, 204 or the configuration or location of the communications infrastructure 102 (e.g., the RCS server 110, the registrar/location server 112, and the file server 116), for example, can be varied according to a particular network that requires a slight variation due to, for example, the type and location of the network or the size or construction of the device or display, power or battery constraints, or accessibility concerns. Such changes are intended to be embraced within the scope of this disclosure.

The specific configurations, method steps, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method performed by a communications infrastructure, the method comprising:
   receiving, at a rich communication services (RCS) server of the communications infrastructure, a message session relay protocol (MSRP) request from a sending device, the MSRP request comprising a plurality of data packets and specifying a receiving device;
   locating, with the RCS server, the receiving device in a file type database comprised of one or more file type compatibilities associated with user devices;
   determining, with the RCS server, that the receiving device is a hypertext transfer protocol (HTTP) enabled device based at least in part on the file type database;
   compiling, with the RCS server or a file server, the plurality of data packets into a single HTTP file; and
   sending, with the RCS server, a HTTP message to the receiving device, the HTTP message comprising at least a link to the single HTTP file to enable the receiving device to download the single HTTP file.

2. The method of claim 1, further comprising:
   storing the plurality of data packets, the single HTTP file, or both on the file server;
   wherein the HTTP message comprises a link to the single HTTP file on the file server.

3. The method of claim 2, further comprising:
   determining that the receiving device has downloaded the single HTTP file from the file server; and
   deleting the plurality of data packets, the single HTTP file, or both from the file server.

4. The method of claim 1, further comprising:
   receiving, from the receiving device at a registrar/location server of the communications infrastructure, a session initiation protocol (SIP) registration message comprising at least a user identification (ID) and a data token associated with the receiving device, the data token comprising at least a file type compatibility for the receiving device; and
   creating an entry in the file type database associated with the receiving device including at least the user ID and the file type compatibility of the receiving device;
   wherein the file type compatibility indicates the receiving device is one of a HTTP enabled device or an MSRP enabled device.

5. The method of claim 4, wherein determining that the receiving device is a HTTP enabled device comprises locating, with the RCS server, the entry associated with the receiving device in the file type database.

6. The method of claim 1, further comprising:
   receiving, from the sending device at a registrar/location server of the communications infrastructure, a session initiation protocol (SIP) registration message comprising at least a user ID and a data token associated with the sending device, the data token comprising at least a file type compatibility for the sending device; and
   creating an entry in a file type database associated with the sending device including at least the user ID and the file type compatibility of the sending device;
   wherein the file type compatibility indicates the sending device is one of a HTTP enabled device or an MSRP enabled device.

7. A method performed by a communications infrastructure, the method comprising:
   receiving, at a rich communications services (RCS) server of the communications infrastructure, a hypertext transfer protocol (HTTP) message from a sending device, the HTTP message comprising a link to at least one HTTP file and specifying a receiving device;
   locating, with the RCS server, the receiving device in a file type database comprised of one or more file type compatibilities associated with user devices;
   determining, with the RCS server, that the receiving device is a message session relay protocol (MSRP) enabled device based at least in part on the file type database;
   dividing, with the RCS server or a file server, the at least one HTTP file into a plurality of data packets; and
   sending, with the RCS server or the file server, an MSRP request to the receiving device, the MSRP request comprising the plurality of data packets and specifying the receiving device.

8. The method of claim 7, further comprising:
   storing the at least one HTTP file, the plurality of data packets, or both on the file server;
   wherein the file server sends the MSRP request.

9. The method of claim 8, further comprising:
   determining that the receiving device has received the plurality of data packets; and
   deleting the at least one HTTP file, the plurality of data packets, or both from the file server.

10. The method of claim 7, further comprising:
receiving, from the receiving device at a registrar/location server of the communications infrastructure, a session initiation protocol (SIP) registration message comprising at least a user identification (ID) and a data token associated with the receiving device, the data token comprising at least a file type compatibility for the receiving device; and
creating an entry in the file type database associated with the receiving device including at least the user ID and the file type compatibility of the receiving device;
wherein the file type compatibility indicates the receiving device is one of a HTTP enabled device or an MSRP enabled device.

11. The method of claim 10, wherein determining that the receiving device is an MSRP enabled device comprises locating, with the RCS server, the entry associated with the receiving device in the file type database.

12. The method of claim 7, further comprising:
receiving, from the sending device at a registrar/location server of the communications infrastructure, a session initiation protocol (SIP) registration message comprising at least a user ID and a data token associated with the sending device, the data token comprising at least a file type compatibility for the sending device; and
creating an entry in a file type database associated with the sending device including at least the user ID and the file type compatibility of the sending device;
wherein the file type compatibility indicates the sending device is one of a HTTP enabled device or an MSRP enabled device.

13. A rich communication services (RCS) server comprising:
one or more processors;
one or more communication connections; and
one or more non-transitory computer-readable media storing computer-executable instructions that, when executed on the one or more processors, cause the one or more processors of the RCS server to perform actions comprising:
receiving a message of a first file type from a sending device, the message comprising content and specifying a receiving device;
locating the receiving device in a file type database comprised of one or more file type compatibilities associated with user devices;
determining based at least in part on the file type database, a file type compatibility of the receiving device;
modifying the message from the first file type to a second file type based on the file type compatibility of the receiving device; and
sending to the receiving device, a message of the second file type comprising at least the content and specifying the receiving device.

14. The RCS server of claim 13, wherein the first file type comprises message session relay protocol (MSRP) and the second file type comprises hypertext transfer protocol (HTTP); and
wherein modifying the message from a first file type to a second file type comprises:
compiling, with the RCS server, a plurality of data packets from the message into a single HTTP file; and
sending, with the RCS server, a HTTP message to the receiving device, the HTTP message comprising a link to the single HTTP file and specifying the receiving device.

15. The RCS server of claim 14, wherein the computer-executable instructions, when executed on the one or more processors, cause the one or more processors to perform further actions comprising:
storing the single HTTP file on a file server that is remote to the RCS server;
wherein the HTTP message comprises a link to the single HTTP file on the file server.

16. The RCS server of claim 15, wherein the computer-executable instructions, when executed on the one or more processors, cause the one or more processors to perform further actions comprising:
receiving an acknowledgement from the receiving device that the receiving device has downloaded the single HTTP file; and
deleting the single HTTP file from the file server.

17. The RCS server of claim 13, wherein the first file type comprises HTTP and the second file type comprises MSRP; and
wherein modifying the message from a first file type to a second file type comprises:
dividing, with the RCS server, a HTTP file from the message into a plurality of data packets; and
sending, with the RCS server, an MSRP request to the receiving device, the MSRP request comprising the plurality of data packets and specifying the receiving device.

18. The RCS server of claim 17, wherein the computer-executable instructions, when executed on the one or more processors, cause the one or more processors to perform further actions comprising:
storing the plurality of data packets on a file server that is remote to the RCS server;
wherein the plurality of data packets comprise a contents of the HTTP file.

19. The RCS server of claim 18, wherein the computer-executable instructions, when executed on the one or more processors, further cause the one or more processors to perform further actions comprising:
receiving an acknowledgement from the receiving device that the receiving device has received the plurality of data packets; and
deleting the plurality of data packets from the file server.

20. The RCS server of claim 13, wherein the file type database is stored on a file server remote to the RCS server; and
wherein locating, with the RCS server, the receiving device in the file type database comprises accessing the file type database on the file server with the RCS server.

* * * * *